US008386810B2

(12) United States Patent
Kansal et al.

(10) Patent No.: US 8,386,810 B2
(45) Date of Patent: Feb. 26, 2013

(54) DETERMINATION OF SOFTWARE MODULE POWER CONSUMPTION BY ANALYZING TOTAL SYSTEM POWER CONSUMPTION OF OPERATIONAL HARDWARE EVENTS AT PLURAL TIMES

(75) Inventors: Aman Kansal, Issaquah, WA (US); Feng Zhao, Issaquah, WA (US); Nupur Kothari, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 12/420,372

(22) Filed: Apr. 8, 2009

(65) Prior Publication Data

US 2010/0262842 A1     Oct. 14, 2010

(51) Int. Cl.
    *G06F 1/32* (2006.01)
(52) U.S. Cl. ........................... 713/300; 713/320
(58) Field of Classification Search .................. None
    See application file for complete search history.

(56) References Cited

U.S. PATENT DOCUMENTS

| | | | |
|---|---|---|---|
| 5,694,607 A | 12/1997 | Dunstan et al. | |
| 6,609,208 B1 | 8/2003 | Farkas et al. | |
| 7,007,256 B2 | 2/2006 | Sarkar et al. | |
| 7,216,243 B2 | 5/2007 | Chou et al. | |
| 2007/0004468 A1 | 1/2007 | Boros | |
| 2007/0219732 A1* | 9/2007 | Creus et al. | 702/61 |
| 2007/0245163 A1 | 10/2007 | Lu et al. | |
| 2009/0006878 A1 | 1/2009 | Borghetti et al. | |
| 2009/0044032 A1 | 2/2009 | Chainer | |
| 2009/0319988 A1* | 12/2009 | Teranishi et al. | 717/110 |
| 2010/0313270 A1 | 12/2010 | Kim et al. | |

OTHER PUBLICATIONS

Jason Flinn, "Managing Battery Lifetime with Energy-Aware Adoptation", ACM Transactions on Computer Systems, vol. 22, No. 2, May 2004, pp. 137-179.*
Chiyoung Seo et al, "An Energy Consumption Framework for Distributed Java-Based Systems", Proceedings of the 22nd IEEE/ACM International Conference on Automation Software Engineering, 2007.*
Mark Nowotarski et al, "Nonintrusive Load Monitoring", Wikipedia, Feb. 12, 2009.*
Chedid, et al., "Power Analysis and Optimization Techniques for Energy Efficient Computer Systems", retrieved on Feb. 17, 2009 at <<http://academic.csuohio.edu/yuc/papers/survey_10_18_final.pdf>>, pp. 1-46.
Choi, et al., "Fine-Grained-Dynamic Voltage and Frequency Scaling for Precise Energy and Performance Trade-off based on the Ratio of Off-chip Access to On-chip Computation Times", retrieved on Feb. 17, 2009 at <<http://atrak.usc.edu/~massoud/Papers/PMU-DVFS-date04.pdf>>, Department of EE-Systems, USC, Los Angeles, CA., 6 pages.
"Enterprise Server and Data Center Energy Efficiency Initiatives", retrieved on Feb. 17, 2009 at <<http://www.energystar.gov/index.cfm?c=prod_development.server_efficiency>>, 4 pages.

(Continued)

*Primary Examiner* — Kenneth Kim
(74) *Attorney, Agent, or Firm* — Lee & Hayes, PLLC

(57) ABSTRACT

Techniques and technologies are disclosed herein for measuring and managing energy consumption of the individual hardware components and software modules of various systems and devices. Such techniques and technologies do not require the addition of hardware to the systems (or devices), the modification of software modules hosted by the systems, or other modifications to the systems. Moreover, some of the techniques and technologies measure the energy consumed by the individual software modules as a result of the hardware operations which they call.

19 Claims, 5 Drawing Sheets

OTHER PUBLICATIONS

"Event Tracing for Windows (ETW)", retrieved on Feb. 17, 2009 at <<http://msdn.microsoft.com/en-us/library/aa468736.aspx>>, 2009 Microsoft Corporation, 1 page.

Fonseca, et al., "Quanto: Tracking Energy in Networked Embedded Systems", retrieved on Feb. 17, 2009 at <<http://www.usenix.org/events/osdi08/tech/full_papers/fonseca/fonseca.pdf>>, 8th USENIX Symposium on Operating Systems Design and Implementation, pp. 323-338.

Krishnan, et al., "Power Analysis of Disk I/O Methodologies", retrieved on Feb. 17, 2009 at <<http://software.intel.com/en-us/articles/power-analysis-of-disk-io-methodologies/>>, Intel Software Network, 11 pages.

Lee, et al., "An Energy Charactization Framework for Software-Based Embedded Systems", retrieved on Feb. 17, 2009 at <<https://gir.kyushu-u.ac.jp/dspace/bitstream/2324/6347/1/donghoon06_1.pdf>>, 6 pages.

Rivoire, et al., "A Comparison of High-Level Full-System Power Models", retrieved on Feb. 17, 2009 at <<http://www.usenix.org/events/hotpower08/tech/full_papers/rivoire/rivoire_html>>, 11 pages.

Seo, et al., "A Generic Approach for Estimating the Energy Consumption of Component-Based Distributed Systems", retrieved on Feb. 17, 2009 at <<http://sunset.usc.edu/publications/TECHRPTS/2005/usccse2005-506/usccse2005-506.pdf>>, Department of Computer Science, USC, Los Angeles, CA., pp. 1-14.

Steigerwald, et al., "Creating Energy-Efficient Software", retrieved on Feb. 17, 2009 at <<http://software.intel.com/media/js/ie_file.php?f=http://software.intel.com/file/1347>>, Intel Leap Ahead, 2007, Intel Corporation, 30 pages.

Coburn et al, "Power Emulation: A New Paradigm for Power Estimation," DAC 2005, Anaheim, California, Jun. 2005, pp. 700-705.

Dong et al, "Sesame: Self-Constructive Energy Modeling for Battery-Powered Mobile Systems," Dec. 2010, pp. 1-14.

Kansal et al, "Virtual Machine Power Metering and Provisioning," SoCC'10, Indianapolis, Indiana, Jun. 2010, 12 pages.

Mayo et al, "Energy Consumption in Mobile Devices: Why Future Systems Need Requirements-Aware Energy Scale-Down," Power-Aware Computer Systems, 2003, 15 pages.

Rantala et al, "Modeling Energy Efficiency in Wireless Internet Communication," MobiHeld'09, Barcelona, Spain, Aug. 17, 2009, pp. 67-68.

Rice et al, "Decomposing power measurements for mobile devices," In Eighth Annual IEEE International Conference on Pervasive Computing and Communications (PerCom), Mar. 29-Apr. 2, 2010, 9 pages.

Thompson et al, "Analyzing Mobile Application Software Power Consumption Via Model-Driven Engineering," in Proceedings PECCS, Feb. 2011, 13 pages.

* cited by examiner

DETERMINATION OF SOFTWARE MODULE POWER CONSUMPTION BY ANALYZING TOTAL SYSTEM POWER CONSUMPTION OF OPERATIONAL HARDWARE EVENTS AT PLURAL TIMES

BACKGROUND

Systems of various types consume energy as a function of the numbers and types of their hardware components and their operations. Software also affects the energy consumption of computing systems because software modules often cause the hardware components to consume energy. For instance, perhaps the most visible way in which software modules consume energy is by calling hardware operations (e.g., accessing a disk drive). However, software modules also consume energy in less visible manners. For example, most software modules require that the memory in which they reside be powered during their execution (particularly if the memory is volatile or if portions of the software modules are loaded from memory at run time). Software modules also require that the processor be energized to execute their instructions.

Energy consumption creates certain problems for computing systems as well as other types of systems. For instance, the consumption of energy generates heat which must be disposed of. If the system does not dispose of the heat, the operating temperature of the hardware components involved and those nearby might rise to undesirable levels. Therefore, computing systems often include cooling features to dispose of such waste heat. These cooling features, however, increase the cost, complexity, weight, size, parts count, etc. of the computing systems. Moreover, purchasing the energy can be expensive (particularly for large computing systems such as data storage silos). The consumption of energy itself can also be problematic if the onboard energy supply of the computing device is limited (as with laptop computers). In such situations, the energy supply (e.g. batteries) must be recharged, replaced, or otherwise supplemented relatively frequently for the use of the computing system to continue without interruption.

While previous energy consumption measuring systems do provide some limited information regarding energy consumption at the computing device level, these previously available systems provide little visibility into how computing devices (and systems) internally consume energy.

SUMMARY

One or more embodiments disclosed herein provide energy consumption measuring systems and methods for use with various systems. Furthermore, these energy consumption measuring systems and methods do not require hardware support from the systems whose energy consumption they measure. More specifically, one or more embodiments provide methods which determine the energy consumed by the various hardware components of computing devices and software modules executed on computing devices and do so without requiring modifications to those computing devices or to the software modules.

Furthermore, techniques and technologies are disclosed herein for measuring and managing energy consumption of the individual hardware components and software modules of various systems and devices. Such techniques and technologies do not require the addition of hardware to the systems (or devices), the modification of software modules hosted by the systems, or other modifications to the systems. Moreover, some of the techniques and technologies measure the energy consumed by the individual software modules as a result of the hardware operations which they call.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the drawings to reference like features and components.

DETAILED DESCRIPTION

Figure 1:
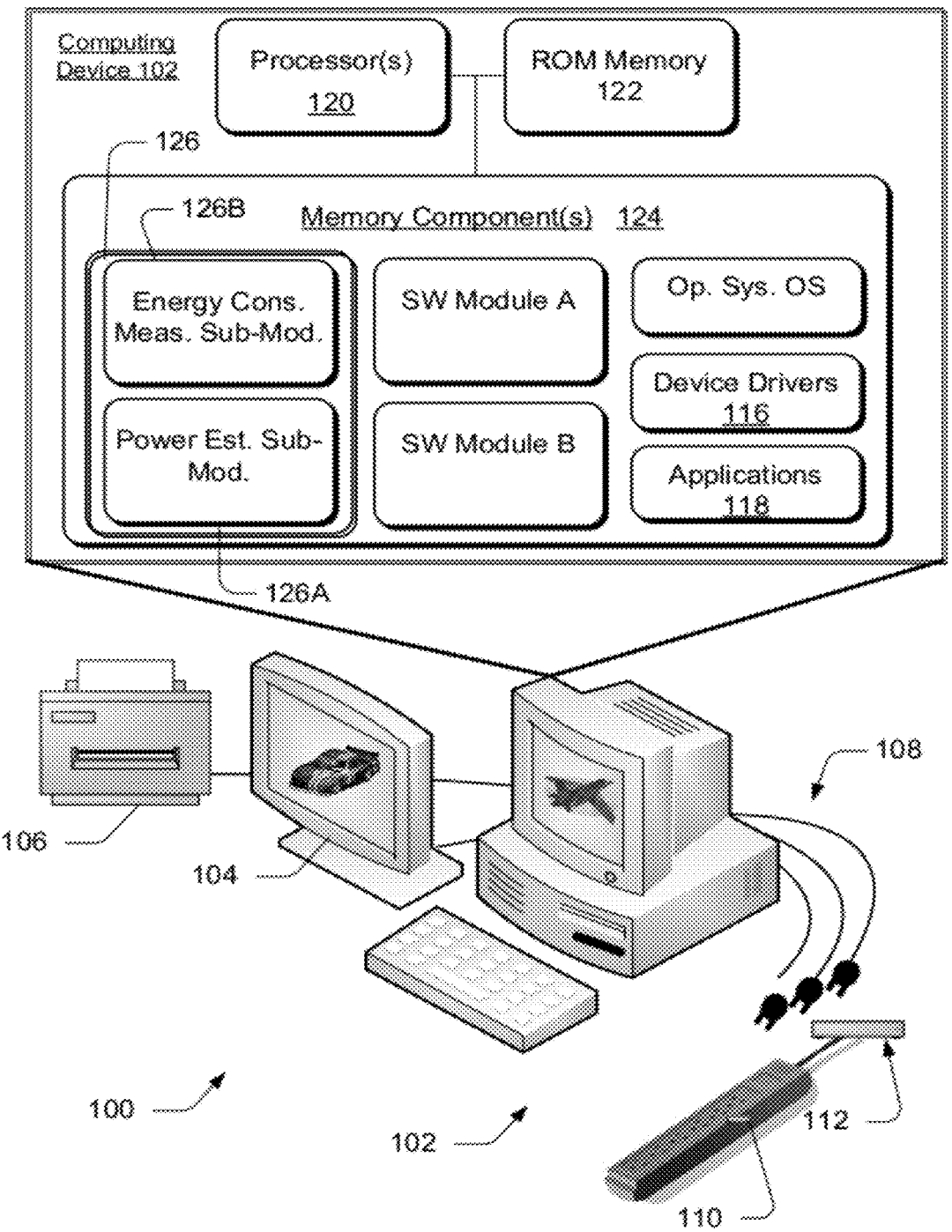
FIG. 1 illustrates a perspective view of a computing system of one embodiment in which energy consumption is measured.

Techniques and technologies for measuring energy consumption are disclosed herein. For purposes of illustration, the current disclosure focuses on computing systems. However, these techniques and technologies and their equivalents apply equally well to systems other than computing systems.

Computing systems and devices often include numerous hardware components and host numerous software modules. Furthermore, computing devices often include a power sensor that monitors the overall power being consumed by the computing device. Even when a particular computing device does not include an overall power sensor, an external power sensor can be used to measure the power consumed by the power device. However, most computing devices will have few if any additional power sensors installed to measure the power consumed by their individual hardware components. Some of the reasons for this lack of instrumentation include a lack of space within the computing devices; a desire to keep the computing devices simple; a desire to keep their parts count low; etc.

Nonetheless, some users may wish to know how much energy (and/or power) the individual hardware components of a computing device consume. Such knowledge can enable the user (or the computing device itself) to manage the energy consumption of the individual hardware components. However, in the absence of appropriate instrumentation, it has heretofore proven impractical to determine the quantity of power that individual hardware components consume.

While it has been impracticable to determine the energy consumed by individual hardware components, determining the energy that a particular software module "consumes" may be even less practicable. This situation is due, in part, to the transient nature of software. For instance, at any given time, the processor of the computing device might or might not be executing a particular software module. Moreover, the hardware operations called for by that software module might or might not coincide in time with the execution of that software module on the processor. In addition, while the software module is actually executing, the computing device is likely to be drawing some varying amount of power due to the activities of other software modules. These circumstances obscure the energy being consumed by the individual software modules. Yet, knowledge of the energy consumption of the individual software modules can allow the users and developers of those software modules to control their design, coding, operation, etc. in view of their energy consumption.

One or more embodiments disclosed herein provide systems for determining the energy consumed by individual software modules. These systems can include two software sub-modules: a power estimation sub-module and an energy consumption determination sub-module. The power estimation sub-module estimates the power consumed by the individual hardware components during their operations, whereas the energy consumption determination sub-module determines the quantity of energy consumed by the individual software applications. More specifically, the systems of the current embodiment use information regarding the scheduling of various activities within the computing device to estimate the power consumed by various hardware components and the energy consumed by various software modules.

Furthermore, methods of some embodiments use "events" (which are generated by an operating system managing the computing device when the software modules access the hardware components) to determine the energy consumption of the individual software modules. More specifically, these methods include repeatedly measuring the power consumption of the computing device while the hardware components are operated. The power measurements are made while the hardware components are in their "as installed" condition. Additionally, during times of interest, events within the computing devices are tracked to determine which software modules use which hardware components, for how long, and for which hardware operations. From the foregoing information, the energy consumption of the individual software modules is determined using various curve fitting techniques (e.g. linear regression).

In some embodiments, the methods include additional steps. For example, the energy consumption of software modules which reside on a network can be determined. In some embodiments, the methods can include controlling the use of particular hardware components depending on the energy consumed by the overall network, certain computing devices on the network, certain hardware components in the computing devices, certain software modules hosted by the network, or combinations of the foregoing. The energy consumption associated with the individual software modules can be determined while the software modules are actually executing or thereafter. Moreover, application program interfaces (APIs) can be used to obtain information from the computing systems to perform the methods disclosed herein.

In some embodiments, tangible computer readable media store computer executable instructions for performing some or all of the methods disclosed herein. Furthermore, one or more embodiments provide computing systems for executing such instructions. Having disclosed the foregoing embodiments at a general level, certain embodiments are now disclosed with more specificity.

First an illustrative computing system is disclosed. Then, illustrative operations of that computing system are used to illustrate how the hardware operations associated with the individual software modules can be tracked. Next, methods of determining the power consumed by illustrative hardware components of that computing system are disclosed. Additionally, methods and systems for determining the energy consumption of the individual software modules hosted by the illustrative computing system are disclosed.

FIG. 1 illustrates a perspective view of an illustrative computing system 100 used herein for non-limiting purposes of illustration. The computing system 100 includes a computing device 102 (e.g. a personal computer, data storage silo, mainframe, etc.) which can be implemented in any number of embodiments with numerous other general purpose or special purpose computing system environments or configurations. In addition, the computing system 100 can include other hardware components such as a (second) display 104, and printer 106. Some or all of these hardware components include power cords 108 for connection to a source of power such as power strip 110. As will be appreciated by those skilled in the art, each of the hardware components of the computing system can include hardware sub-components (e.g., hard drives, removable media drives, processors 120, network interface cards, thermal inkjet engines, etc.). The computing system 100 and/or computing device 102 can include one or more power sensors 112 which are discussed further herein. While a distinction has been drawn between computing system 100 and computing device 102, that distinction is not intended to be limiting. Rather, computing device 102 can be considered a computing system (and vice versa) without departing from the scope of the disclosure.

With continuing reference to FIG. 1, the hardware components of computing system 100 can have certain software modules A and B associated with them such as device drivers 116, applications 118, operating systems OS, etc. As the software modules A and B execute, they generate certain messages, function calls, etc. which herein are termed "events." Events are typically defined by the operating system OS and the various software modules. These events include calls by the software modules A and B to use the various hardware components of computing system 100. Such calls by the software modules A and B to the hardware components can be performed in conjunction with the operating system OS of the computing system 100. In turn, or as the operating system OS might control, the operating system OS activates the device drivers 116 to manage the operation of the hardware components. Typically, the operating system OS manages these device drivers 116 (and the other software modules A and B) and is therefore aware of the various hardware related events, the hardware components involved, the software modules A and B which generated the events, and the times at which the corresponding hardware operations begin and end. This information, and more, is available via an API associated with the operating system OS in some embodiments.

With continuing reference to FIG. 1, each of the hardware components of the computing system 100 consumes power as it operates. More particularly, as the various software modules A and B in the computing system 100 call for various hardware operations, and as those hardware operations are performed, the software modules A and B cause the hardware components to consume power. A power sensor 112 measures the overall power being consumed by the computing system 100 (assuming that all of the power drawn by the computing system 100 is drawn through power strip 110). Power sensor 112 can be any type of watt meter, combination of voltmeter and current meter (with supporting logic to convert the sensed voltage and current into a power measurement), etc. In some embodiments, as is shown, power sensor 112 is built into the computing system 100 or (when some particular hardware component is considered as the computing system) is a component of the computing system. In other embodiments, however, power sensor 112 could be an external power sensor. Typically though, the limited volume, part counts, etc. of the hardware components of the computing system 100 constrain the number of power sensors, installed in the computing system 100. Indeed, in some situations, no power sensor exists within computing system 100. Thus, computing systems 100 usually do not include power sensors for each of the various hardware components thereof.

With continuing reference to FIG. 1, the software modules A and B of computing system 100 execute on the processor of the computer system and may call hardware operations (other than the hardware operation of the processor executing those software modules A and B) and then idle while awaiting the results of these operations. Moreover, it is often the case that while the hardware operations called for by software modules A and B are being performed, the processor of the computing system 100 can be idle or executing other software modules. As a result, the execution of a particular software module on the processor frequently fails to correspond to the times during which that software module causes energy consumption via the other hardware components. Further still, each of the software modules A and B can access, drive, execute on, or otherwise use the various hardware components of computing system 100 at times that are difficult to predict. Moreover, it is also often the case that many software modules A and B will be using combinations of the hardware components of computing system 100 in parallel with each other.

Additionally, many processors 120 within the computing system 100 "time slice" the software modules A and B so that each software module appears to be executing continuously. In actuality, though, each software module A or B executes repeatedly for relatively short periods of time. Between these times, the software module A or B can be resident in random access memory (RAM), ROM 122 (read only Memory) or can be stored in permanent or long term memory components 124. Between these times, the hardware operations called for by some, none, or all of the software modules A and B might be underway. As mentioned previously though, the power consumed by the hardware components is delivered via a common power source and (if a power sensor 112 is installed) sensed by the power sensor 112. Thus, it has heretofore proven impractical to determine the power that individual software modules A and B consume.

In some embodiments, an energy consumption measuring module 126 determines the energy consumption associated with the individual software modules A and B of computing system 100. The energy consumption measuring module 126 can include two sub-modules. One of those sub-modules is executed to determine how much power the various hardware components of the computing system 100 consume during their various operations. Moreover, the power estimation sub-module 126A is executed sometime after the computing system 100 is configured (or subsequently modified). The power estimation sub-module 126A repeatedly measures the power being drawn by the overall computing system 100 via overall power sensor 112. That power, of course, varies as the computing system 100 operates and each of its hardware components transition from one operation to another.

Nonetheless, the measured computing system power reflects the transitions between these separate, distinct, and disparate hardware operations. The power estimation sub-module 126A uses information regarding these identifiable hardware operations to determine the power consumption of each type of operation of each hardware component from the measured computing system power. However, numerous hardware operations of the computing system 100 may occur in parallel thereby obscuring the power consumption of any one individual hardware component. In some embodiments, therefore, the power estimation sub-module 126A applies curve fitting techniques (such as linear regression) to the measured power to estimate the power consumption of each hardware component of computing system 100 during each of its types of operations.

With continuing reference to FIG. 1, the other of the two sub-modules of the energy consumption measuring module 126 measures the energy consumption of the individual software modules A and B associated with computing system 100. The activities of the energy consumption measuring sub-module 126 B and the power estimation sub-module 126A can occur in parallel or even at different times. Indeed, in some embodiments, the power sensor 112 can be installed to support the power estimation sub-module 126A and then removed before the energy consumption measuring sub-module 126B begins execution. In some embodiments, the energy consumption measuring sub-module 126B can execute first and then the power estimation sub-module 126A can execute. Thereafter, information derived from the two sub-modules 126A and 126B can be used to complete the determination of the energy consumption of each software module A and B.

In general, the energy consumption measuring module 126 maintains (or accesses) a log of the events which occur as the software modules A and B execute in computing system 100 during some time of interest. By analyzing the event related information, the energy consumption measuring sub-module 126B tracks which software module A or B called for each of the hardware operations during that time. The energy consumption measuring sub-module 126B also associates the appropriate power consumption estimates (from the power estimation sub-module 126A) with the appropriate software modules A or B and converts the power estimates to energy consumption (by multiplying the power consumption estimates by the duration of the corresponding hardware operations). For each software A or B, the energy consumption measuring module 126 sums the energy consumed by each hardware operation associated with that software module A or B to arrive at the energy consumption of that software module.

Furthermore, the energy consumption measuring module 126 can be implemented in a networked environment. For instance, computing system 100 can include multiple computing devices 102 interconnected by a computing network. Each of the computing devices 102 could host an energy consumption measuring module 126 (or a portion thereof). Each of these distributed energy consumption measuring modules can measure the energy consumption of the software modules A and B within corresponding portions of the computing system 100 (e.g. within a particular computing device 102). Additionally, the corresponding sets of energy consumption data can be combined to yield an energy consumption measurement for each of the individual software modules A and B on the computing network.

Figure 2:
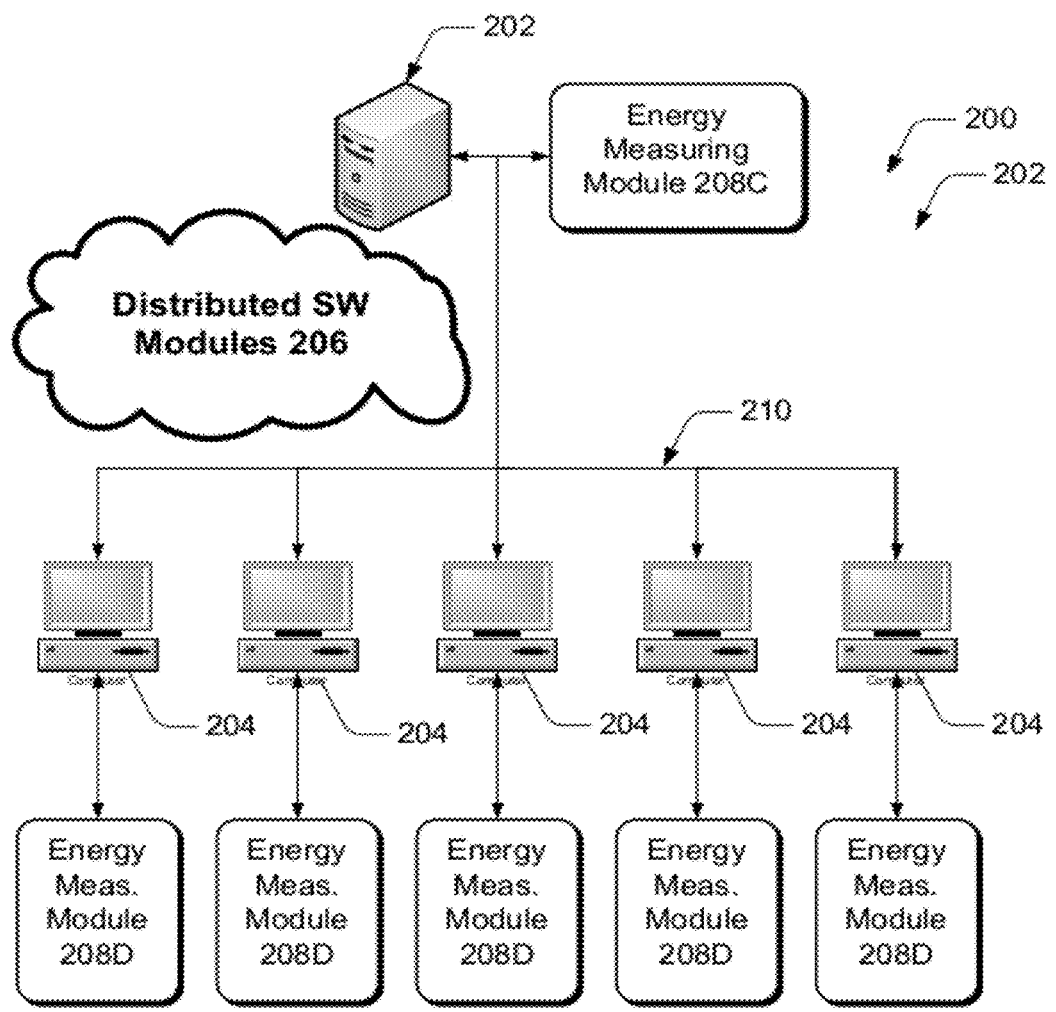
FIG. 2 is a block diagram of a computing system of one embodiment in which energy consumption is measured.

FIG. 2 is a block diagram of an illustrative architecture 200 of one or more embodiments. The architecture 200 incorporates a energy consumption measuring system 202 distributed over the architecture 200 and configured to measure the energy consumption of individual hardware components 204 and individual software modules 206 across the architecture 200. In various embodiments, the individual energy consumption measuring modules 208 can be configured to perform all or a portion of the functions described herein and to communicate with each other to that end (among others).

As disclosed herein, such a distributed arrangement of energy consumption measuring modules 208 can be advantageously employed in situations in which at least one software module 206 (or some of its hardware operations) is distributed across the architecture 200 and the hardware components 204 therein. File sharing applications, web server applications, client-server applications, network router applications, data centers, server clusters, client machines, network equipment, and many other illustrative applications too numerous for practical enumeration are known and are within the scope of the disclosure. All of these software modules 206 and many other software modules 206, therefore cause the consumption of energy in more than one hardware component 204 of the architecture 200. Thus, a distributed version of an energy consumption measuring system 202 can be advantageously employed to measure the energy consumption associated with these distributed software modules 206.

In the energy consumption measuring system 202, the distributed energy consumption measuring modules 208D determine the energy consumption associated with the software modules 206 (no matter on which hardware component 204 these software modules 206 may be hosted) on the particular hardware components 204 that hosts the energy consumption measuring modules 208D. The distributed energy consumption measuring modules 208D communicate these energy consumption figures to the central energy consumption measuring module 208C. The central energy consumption measuring module 208C sums the energy consumption figures associated with each software module 206 (on each of the hardware components 204) to determine the energy consumption associated with each software module 206 across the architecture 200. Having disclosed aspects of the illustrative computing systems 100 and 200, aspects of the operation of such computing systems 100 and 200 will now be further disclosed.

Figure 3:
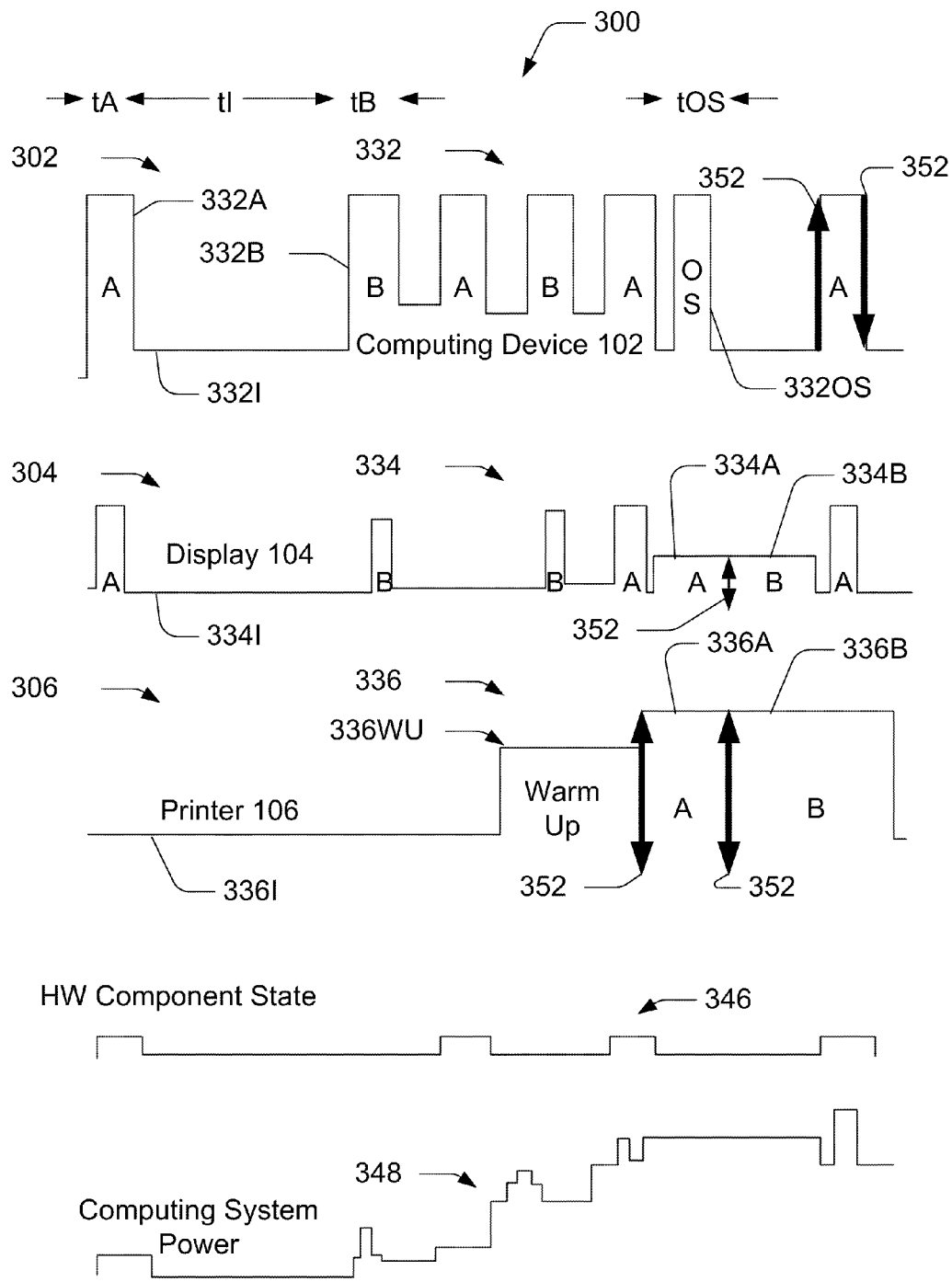
FIG. 3 is a timeline which illustrates the operation of one embodiment of a computing device in which energy consumption is measured.

FIG. 3 is an illustrative timeline associated with computing system 100 (of FIG. 1). More particularly, FIG. 3 illustrates that particular software modules A and B frequently call for numerous hardware operations. For any particular hardware operation called for by a particular software module A, B, or OS, it is likely that the hardware operation will occur at or after the time of the call. As shown by FIG. 3 and discussed further herein, the processor may execute a part of software module A, B, or OS and then enter some quiescent phase even though some other hardware component is performing the hardware operation which one of the software modules called. As a result, even though the processor is quiescent (or perhaps is performing unrelated activities) the software module A, B or the OS might be consuming power albeit via a different hardware component (or more than one hardware component). As a result, the time during which that hardware operation is being performed does not necessarily correlate to the time of the call, the time that the software module A or B was executing, or the time at which that the software module A or B decided that the hardware operation was desirable. Instead, any instance of a hardware operation corresponds to the call for that hardware operation by a particular software module A or B at a particular time (of the corresponding event). Accordingly, because that software module A or B called for that hardware operation, the power consumed during that hardware operation is attributable to that software module A or B despite these and other timing issues.

In part, the timeline 300 is presented to illustrate a manner in which energy consuming hardware operations can be identified, tracked, and associated with certain individual software modules A, B and OS. More particularly and as illustrated by FIG. 3, the timeline 300 includes a set of energy consumptions 302, 304, and 306 which are associated with, respectively, the computing device 102, the display 104, and the printer 106 of FIG. 1.

More specifically, energy consumption 302 illustrates that software modules A, B, and OS (the operating system OS) consume respectively powers 332A, 332B, and 332OS. Each of these powers 332 correspond to some type of hardware operation of the computing device 102. While FIG. 3 illustrates that many of these powers 332 have the same in magnitude, this illustration is not intended to be limiting. For instance, the magnitude of the powers 332A, 332B, and 332OS could be different from each other. Indeed, even the magnitudes of the powers 332 associated with any particular software module A, B, OR OS could vary. For instance, should a particular software module A call for the use of the RAM memory of computing device 102, one power 332 of a particular magnitude would result. However, should that software module A call for the use of the DVD drive of computing device 102, a power 332 with a different magnitude could occur.

FIG. 3 also illustrates additional aspects of the timeline 300. More particularly, FIG. 3 illustrates that the computing device energy consumptions 302 each last for times t. As used herein tA (or tB or tOS) indicates the time during which a hardware operation called for by software module A (or the software module B or the operating system OS) occurred. Furthermore, time tI indicates a time during which a hardware component is idle (or being used by software modules other than the software modules of interest). Times tA, tB, tI, and tOS may differ from each other even for similar operations. Moreover, the times t can vary even when they are associated with the same software module.

Another aspect of the timeline 300 that FIG. 3 illustrates is that the computing device 102 can idle between the energy consumptions 302. Even during these idle times tI though computing device 102 will consume some power 332I. The idle times tI of course can vary with the operations of computing device 102. FIG. 3 also illustrates that since the computing device 102 can switch between energy consumptions 302 as quickly as every few microseconds (and faster in the future), the powers 332 are tracked at correspondingly frequent intervals. However, tracking the powers 332 at more and less frequent intervals is included within the scope of the disclosure.

Still referring to FIG. 3, but now with a focus on the display energy consumptions 304, FIG. 3 shows that the various software modules A and B can cause various powers 334 to be consumed by the display 104. For example, displaying a particular static image on the display 104 will cause some power 334 to be consumed. Booting up a display 104 for use by a particular software module (when no other operations call for it) will also cause some power 334 to be consumed and probably more power 334 than simply displaying a static image.

FIG. 3 also illustrates that various printer operations can result in differing powers 336 to be consumed. For example warming up the printer 106 can cause power 336WU to be consumed while other operations (e.g., text printing operations or graphics printing operations) can cause other powers 336A and 336B to be consumed. Similar scenarios occur within the computing device 102 at the sub-component level as the software modules A and B call for internal hardware operations. For instance, the execution of a particular software module A on a processor 120 core of computing device 102 causes some power 332 to be consumed. In contrast, execution of that software module on multiple processor 120 cores of the computing device 102 cause yet another power 332 to be consumed.

Moreover, in some situations, the operating system OS of the computing device 102 dictates the scheduling of certain operations. The operating system OS, for example, often accumulates many disk access operations and executes them en masse. The operating system OS also often groups disk operations of the software modules A and B to occur in consecutive blocks. Thus, while the power consumption associated with the disk operations for software modules A and B are attributable to software modules A and B respectively, the power consumption associated with spinning up the disk might be accounted for in other fashions. For instance, the disk spin up power could be allocated among the software modules A and B involved in the en masse access or the power could be associated with the operating system OS.

FIG. 3 also illustrates the power consumed by the computing system 100 as the various software modules A, B, and OS cause (or affect) the various hardware operations. More particularly, as made evident by the foregoing, each of the various hardware components of the computing device 102 can have one or more power (or operational) states 346 which cause differing powers 332A, 332B, 332OS, 332I 334A, 334B, 334OS, 334I, 336A, 336B, 336WU, and 336I to be consumed. Thus, the computing system power 348 reflects the summation of all of the powers 332, 334 and 336 at any given time t. However, the computing system power 348 need not equal the power (as measured) that is actually being consumed by the overall computing system 100. This apparent discrepancy arises because the energy consumption measuring module 126 of various embodiments need not account for each and every power state 346 of the hardware components (or for all of the unknowns associated with the consumption of power within computing system 100). This aspect of the energy consumption measuring module 126 will be further disclosed herein.

Suffice it to say for now that the energy consumption measuring module 126 compensates for imperfect knowledge of the power consumption within computing system 100. That being said, to convert the powers 332, 334, and to 336 to the energy consumed during some time of interest, the energy consumption measuring module 126 multiplies those powers 332, 334, and 336 by the corresponding times t during which each of those powers was being consumed.

To do so, though, the energy consumption measuring module 126 uses information obtained from the events (and scheduling functions of the operating system) to determine the times t. These events are usually messages which convey information about changes in the operations of the computing system 100, its hardware components, software modules A and B, etc. Some illustrative events 352 are illustrated in FIG. 3 by arrows at power state 346 transitions. Note that some events 352 can occur in relatively rapid succession such as when a given hardware component (e.g., display 104) transitions from servicing one software module A to serving another software module B. Regardless of the types, forms, protocols, formats, etc. of the events 352, the energy consumption measuring module 126 examines information in the events log of the computing system 100 to determine certain information related to the hardware operations. An example events log is illustrated by Table 1.

TABLE 1

Example Events Log

| Start Time | End Time | Calling SW Module | Called HW Component | Operation |
|---|---|---|---|---|
| 9:46:06.000001 | 9:46:06.000002 | A | Printer 106 | Built In Test |
| 9:46:06.000002 | 9:46:06.000004 | B | Printer 106 | Print |
| 9:46:06.000004 | 9:46:06.001003 | OS | Printer 106 | Post Ops. |
| 9:46:06.001005 | 9:46:06.001009 | B | Display 104 | Boot |

From the information in the events log, the energy consumption measuring module 126 also determines which of the software modules A, B, and OS caused the hardware components to enter and to leave the various power states 346. As the foregoing shows, the energy consumption measuring module:

1. Detects each instance of each power state within the time of interest,
2. Determines the software module A, B, or OS causing each instance of each power state 346, and
3. Determines the times t during which each instance of each power state 346 lasted.

As will be seen shortly, the energy consumption module also:

4. Estimates the power consumed in each power state 346 (prior to the time of interest in some embodiments) and
5. Applies those power estimates to the various power states 346 to measure the energy consumption associated with each software module A, B, and OS.

Thus, a method of one or more embodiments of estimating the energy consumption of each hardware component in each of its power states 346 (or a subset thereof) is now disclosed. More particularly, the actual power consumption of each hardware component can be mathematically derived from the computing system 100 power as measured with overall power sensor 112. Furthermore, this determination can be made once for a given configuration of the computing system 100. The resulting actual power consumption estimates can be used to determine the energy consumption of the software modules A, B, and OS during various times of interest. Furthermore, the times of interest can be after these estimates are derived or any other time (so long as the event log information eventually becomes available).

Accordingly, one method of mathematically deriving the actual power consumption of the hardware components is described as follows. Suppose that a particular hardware component c spends a particular time t in a power state k. That time can be represented by tkc. The power Pkc consumed by that hardware component c for that instance of that power state k is an unknown since it cannot be measured directly in many computing systems 100. However, it follows that the energy consumed by component c during time tkc is equal to Pkc*tkc. Furthermore, the energy E(T) consumed by the computing system 100 is the sum of the energy consumed by all hardware components. Therefore, the energy E(T) consumed by the computing system 100 can be represented as:

$$E(T)=\Sigma Pkc*tkc+a \qquad \text{Eq. 1:}$$

Where the sum is taken over all hardware components c and their corresponding power states k; E(T) is the energy consumed over some duration of length T; and 'a' is a constant to account for unknowns in the power consumption associated with computing system 100. Furthermore, the instantaneous computing system power p(t) is measured with power sensor 112 (see FIG. 1) and integrated over duration T to yield E(T). Accordingly, E(T) is known. Therefore, for each of the durations T, Equation 1 can be rewritten as follows:

$$E(T)=Pk102*tk102+Pk104*tk104+Pk106*tk106+A \qquad \text{Eq. 2:}$$

Where A is a constant to account for unknowns and duration T is short enough that the various power states k are likely to have remained constant. As the duration T decreases the unknowns as represented by A (including power state transitions during duration T) decrease and the accuracy of the current method increases. The duration T can therefore be selected to yield a desired accuracy in the results of the analysis. Moreover, Equation 2 can be expanded to include terms to account for any, or all, of the hardware components having multiple states during duration T.

By repeatedly measuring E(T) with power sensor 112 (while the hardware components are exercised through their power states 346 or are operating as a user may desire), a set of simultaneous versions of Equation 2 can be found with one equation corresponding to each of the durations T. Moreover, a set of simultaneous equations large enough to solve for all of the variables (the power Pkc and unknown A terms) can be created by measuring E(T) for a number of durations T equal to or greater than the number of power states 346 for all of the hardware components of interest. Thus, using the set of simultaneous equations, energy consumption measuring module 126 determines the power Pkc consumed by each of the hardware components in their various power states 346 (see FIG. 3).

As noted previously, the energy consumption measuring module 126 parses the event log and determines which software modules A, B and OS caused the power states 346 during the time of interest. For each individual software module A, B, and OS, energy consumption measuring module 126 sums the powers Pkc for each of the power states 346 that that software module caused and multiplies the results by the corresponding lengths of time t. Thus, the energy consumption measuring module 126 determines the energy consumption of the software modules A, B, and OS during the time of interest. The foregoing disclosure illustrates that various methods and systems can measure the energy consumed by the individual software modules.

Additionally, in some embodiments, the energy consumed by all of the software modules can be summed and compared to the energy consumption as measured by the power sensor 112. If the error (or unknowns term A) is larger than desired, various modifications to the foregoing analyses can be made. For instance, the durations T can be reduced to improve the results. In the alternative, or in addition, more hardware components and/or more power states 346 (the Pkc terms) can be added to the analyses. Thus, the user (or the energy consumption measuring module) can adjust the foregoing analyses to achieve desired accuracy levels.

Thus, when a software module A or B (or the operations called for by it) is executing, some hardware component either the processor or another component is being used and consuming energy. The powers 332, 334, and 336 in FIG. 3 represent the energy consumption of the computing device 102, display 104, and printer 106. The computing system power 348 should therefore reflect the energy consumption of the entire complete system 100 (assuming that all hardware components are accounted for in the powers 332, 334, and 336). Having discussed how, and when, energy is consumed within computing system 100, methods and systems of several additional embodiments are now disclosed.

Figure 4:
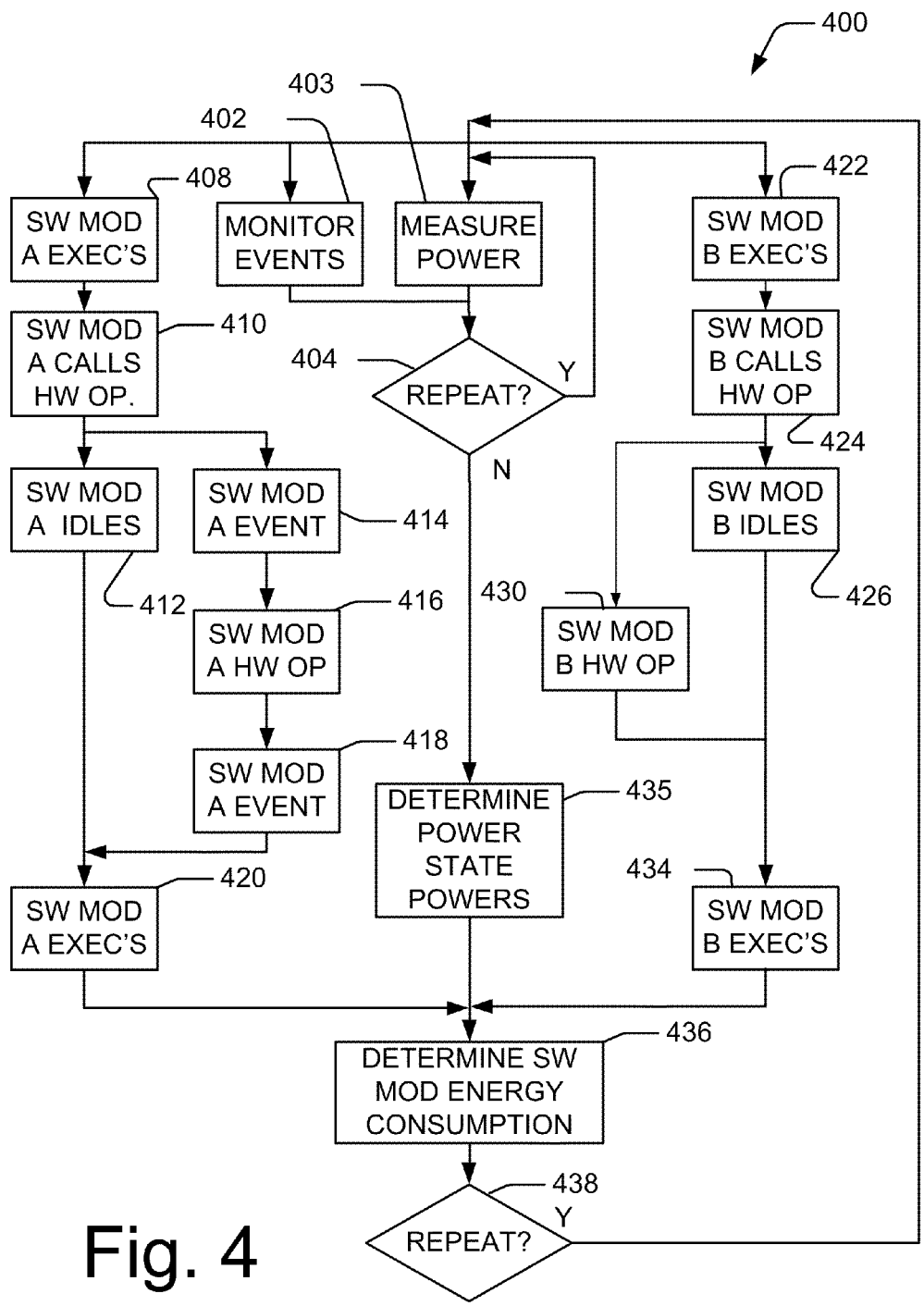
FIG. 4 is a flowchart which illustrates a method of one embodiment of measuring energy consumption.

FIG. 4 illustrates a method of one or more embodiments of measuring the energy consumed by individual software modules A and B. Method 300 includes three general sets of activities. One set of activities (shown generally in the center of FIG. 4) involves operations associated with energy consumption measuring module 126 (see FIG. 1). Another set of activities (shown generally on the left) involves operations associated with a particular software module A. The third set of activities (shown generally on the right) involves operations associated with another particular software module B. Of course, the activities illustrated by FIG. 4 could be organized differently and could reflect more, or fewer, software modules A and B.

In any case, FIG. 4 illustrates that at some time, energy consumption monitoring module 126 begins (or continues) monitoring computing system 100 for events. See step 402. Moreover, the energy consumption measuring module 126 also begins measuring computing system power via power sensor 112 to obtain measurements of the overall energy consumption E(T). See step 403. The energy consumption measuring module 126 can obtain as many (or more) measurements of the overall energy consumption E(T) as there are power states 346 associated with the hardware components of the computing system 100. Accordingly, at step 404, these measurements can be repeated until the desired number of measurements have been obtained.

FIG. 4 also illustrates that at some time software module A begins executing in computing device 102 of FIG. 1. See step 408. Thus, computing device 102 could switch from a power state 346 in which it consumes power 332I (see FIG. 3) to another power state 346 (associated with executing software module A) in which it consumes power 332A. The switch of the computing device 102 to executing software module A (from the processing it might have been performing before) is typically associated with an event 352 of which operating system OS is aware. As software module A executes, FIG. 3 illustrates that it issues a call for some hardware operation at step 410. The call by software module A either is or causes\ an event 352 indicating that a corresponding hardware operation is to begin. See step 414. The software module A can then idle or continue executing depending on circumstances. See step 412. Thus, the computing device 102 might again transition between power states 346. The foregoing events 352 are detected by energy consumption measuring module 126 via step 402.

In the meantime, the hardware operation is illustrated as occurring at step 416 for some amount of time determined by the nature of the hardware operation, the parameters of the hardware operation as determined by the software module A, etc. A corresponding power state 346 transition occurs for the hardware component involved as the hardware operation begins. Thus, at least for the time being, software module A might be inactive yet still causing a hardware operation which results in some power being consumed by some hardware component.

At some time the hardware operation called for by software module A terminates and a corresponding event 352 is generated (which typically conveys the results of the hardware operation to the calling entity, here software module A). See step 418. Moreover, the hardware component involved in this operation undergoes a corresponding power state 346 transition associated with the termination of this operation. Software module A might subsequently resume executing in computing device 102 (with corresponding power state transitions) as illustrated by step 420.

In the meantime, software module B could begin executing and calling for hardware operations. See steps 422, 424, 426, 430, and 434 (the event 352 related steps associated with the hardware operations associated with software module B are not shown for clarity). The resulting hardware operations associated with software module B might be occurring in parallel with the hardware operations associated with software module A. In the meantime, energy consumption sensing module has been repeatedly measuring the computing system power and obtaining event related information from the operating system OS. See steps 402, 403, and 404. Thus, energy consumption measuring module 126 has sufficient information to determine the energy consumption of each of the software modules A and B.

More particularly, in step 435, the energy consumption measuring module 126 uses the repeated measurements of overall energy consumption E(T) to solve a set of simultaneous equations. The results of that analysis include the energy consumption associated with each power state 346 of each hardware component. Note that step 435 is shown as occurring prior to the execution of software modules A and B in steps 420 and 434 to illustrate that the determination of the powers 332, 334, and 336 associated with the various power states 346 can be performed independently of the execution of the software modules A, B, and OS.

In parallel, or at some other time, the energy consumption measuring modules can parse the event related information which it has obtained to determine which power states 346 occurred during a time of interest, for how long they occurred, and which software modules A, B or OS called for the corresponding hardware operations. The energy consumption measuring module 126 can multiply the power consumption for each of the power states 346 by the times t corresponding to the durations of the underlying hardware operations to obtain the energy consumption of those hardware operations. The energy consumption figures obtained by the foregoing analysis can be associated with the software modules A, B, and OS which called for the underlying hardware operations.

Moreover, for each of those software modules A, B and OS, the energy consumption figures associated therewith are summed to arrive at the energy consumption for the individual software modules A, B, and OS. See step 436. FIG. 4 also illustrates that the method 400 can be repeated as desired to measure the energy consumption of the software modules A, B, and OS during other times of interest although the determination of the power state 346 power consumption figures could be omitted during subsequent repetitions of method 400. See step 438.

Figure 5:
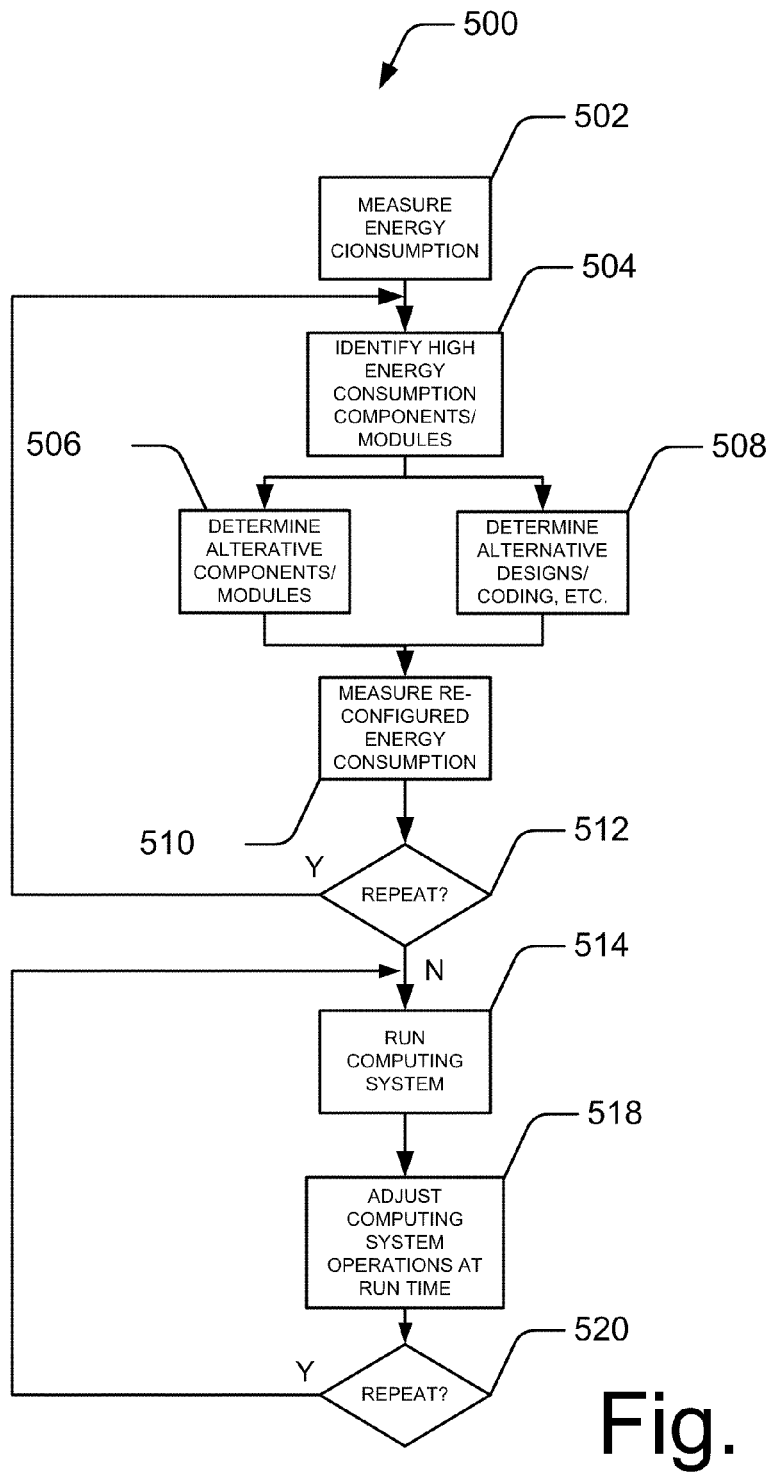
FIG. 5 is a flowchart which illustrates a method of one embodiment of managing energy consumption.

FIG. 5 is a flowchart illustrating a method of managing the energy consumption of a computing system of one or more embodiments. The method 500 includes various steps such as step 502 at which the energy consumption of a distributed computing system (for example, see the architecture 200 of FIG. 2) is measured. During step 502, the energy consumption of the individual hardware components 204 and software modules 206 are determined by the energy consumption measuring system 202. At step 504, the individual hardware components 204 and software modules 206 which consume more than a selected threshold of energy are determined.

These high energy consumption hardware components 204 and software modules 206 are then studied for potential energy savings. More particularly, the computing system as a whole can be searched to determine alternative hardware components 204 or software modules 206 with which the high energy consumption hardware components 204 or software modules 206 can be replaced. Thus, low energy consumption hardware components 204 and software modules 206 are selected for use in the computing system. See step 506. Certain high energy consumption hardware components 204 and software modules 206 can also be studied to determine alternative designs, coding techniques, etc. which will lower their individual energy consumption. See step 508.

In method 500, the computing system is reconfigured according to the foregoing selections. The reconfiguration can be made as a one-time modification to the computing system wherein certain hardware components or software modules are installed, removed, modified, etc. In the alternative, or in addition, the reconfiguration can be user controlled wherein the user may adjust the quality of service or performance of the computing system 100 to, for instance, vary the optimization of the computing system 100. At step 510, the computing system can be run for some time during which the energy consumption of the reconfigured computing system is measured. The energy consumption results are analyzed and if desired, the method 500 can be repeated to again reconfigure the computing system to a more energy efficient configuration. See step 512.

The computing system of architecture 200 can be allowed to operate and the energy consumption of the hardware components 204 and the software modules 206 can be continuously determined. See step 514. Depending on the energy consumption results, the operation of selected portions (either hardware components 204 or software modules 206 or combinations thereof) of the computing system can be adjusted to achieve a selected result in terms of the system-wide energy consumption. For instance, certain software modules 206 might be replaced with more energy efficient (but perhaps, slower) software modules 206. Certain high energy usage software modules 206 might be scheduled for execution for times when purchased energy might be less expensive (e.g., late nights and early mornings). Operations involving energy intensive hardware components 204 might be re-routed to other less energy intensive hardware components 204. A tradeoff with other parameters might be called for in such situations. However, even so, embodiments provide the user more detailed energy consumption information than heretofore available to make such decisions. In any case, at step 518 the operation of the computing system or portions thereof, is adjusted at run time in response to the energy consumption within the computing system as measured in accordance with method 300. Moreover, these adjustments (if any) can be repeated if desired as indicated by step 520.

As discussed previously, the foregoing embodiments provide methods and systems for measuring the energy consumption associated with individual software modules whether these software modules are hosted by one computing device (and use many hardware components therein in parallel) or they are distributed across more than one computing device. With knowledge of the energy consumption of the software modules and hardware components, users of the computing systems can better manage the power consumption of the computing systems, hardware components thereof, and software modules hosted thereby. For instance, the user could optimize the power consumption of the various computing devices.

Moreover, the energy consumption differences between similar types of operations can be measured and used to alter the activities of computing systems. More particularly, activities and/or software modules (or portions thereof) which exhibit relatively high energy consumption can be replaced with activities and/or software modules which exhibit relatively low energy consumption. Further, with the increased insight into energy consumption within computing systems as disclosed herein, tradeoffs between energy consumption and other operating parameters can be made in the design, development, operation, maintenance, etc. of various computing systems. In some situations, should the user desire, the user could minimize, maximize, or otherwise modify the power consumption of certain computing systems, the hardware components thereof, the software modules hosted thereby, etc.

Thus, embodiments are disclosed herein which provide numerous advantages over previously available energy consumption measurement systems and methods. More specifically, the embodiments disclosed herein and their extensions, modifications, equivalents, etc. can be used with numerous systems (e.g. computers, computer networks, cellular telephones, cellular telephone systems, building energy management systems, etc.) to measure and control the consumption of energy by these systems. For instance, the power consumption of various mobile devices can be monitored and controlled to extend the time these devices can operate without having their batteries recharged. Additionally, active and passive cooling devices and systems can be eliminated or reduced in size, complexity, cost, etc.

Although embodiments of energy consumption measuring systems and methods have been disclosed in language specific to structural features and/or methods, it is to be understood that the subject of the appended claims is not necessarily limited to the specific features or methods disclosed. Rather, the specific features and methods are disclosed as non limiting implementations of power measuring systems and methods.

The invention claimed is:

1. A method comprising: breadth
    repeatedly measuring power consumed by a computing system including a plurality of power-consuming hardware components and hosting a plurality of software modules, wherein each of the software modules uses one or more of the hardware components during a corresponding plurality of times such that the software modules cause the hardware components to consume power and wherein each of the software modules generates corresponding to the use of the hardware components by the software module; and
    determining an energy consumption associated with a software module using the hardware components during the times by analyzing the measurements of power consumed by the computing system and the events corresponding to the use of the hardware components by the software modules during the corresponding times;
    wherein the software modules do not include code specifically intended to associate the events with the software modules for determining the energy consumption of the associated software module.

2. The method of claim 1 wherein the computing system comprises a network of multiple interconnected computing devices.

3. The method of claim 2 wherein at least one hardware component is a processor and the hardware operation is executing the software module.

4. The method of claim 1 further comprising controlling the use of a hardware component by the software module responsive to the computing system power measurements or the determined energy consumption associated with the software module.

5. The method of claim 1 further comprising determining an idle power of the computing system by analyzing the computing system power measurements and the events associated with the use of the hardware components during the times by the software module.

6. The method of claim 1 wherein the determining of the energy consumption associated with the software module occurs after the software module uses the hardware components during the times.

7. The method of claim 1 further comprising using an application program interface (API) to obtain the events associated with the software module.

8. The method of claim 1 wherein an event is a call to a driver associated with a hardware component.

9. The method of claim 1 wherein the determining of the energy consumption
    the times by analyzing the computing system power measurements and the events associated with the use of the hardware components during the times and by the software module, wherein the determining the energy consumption of the associated software modules is not based on a result of code included in the software modules that is specifically intended to associate the events with the software modules associated with the software module further comprises using linear regression to analyze the computing system power measurements.

10. A computer readable storage medium storing computer executable instructions which when executed cause the computer to perform operations comprising:
    repeatedly measuring a power consumed by a computing system including a plurality of power consuming hardware components and hosting a plurality of software modules, wherein each of the software modules uses one or more of the hardware components during a corresponding plurality of times such that the software modules cause the hardware components to consume power, and wherein each software module generates events corresponding to the use of the hardware components by the software module;
    determining an energy consumption associated with a software module using the hardware components during for determining the energy consumption of the associated software modules based at least in part on the measurements of power consumed by the computing system power measurements and the events corresponding to the use of the hardware components by the software modules during the corresponding times and by the software module, wherein the determining the energy consumption of the associated software modules is not based on a result of code included in the software modules that is specifically intended to associate the events with the software modules for determining the energy consumption of the associated software modules; and
    controlling the use of a hardware component by the software module responsive to the repeated computing system power measurements and the determined energy consumption associated with the software module.

11. The computer readable storage medium of claim 10, wherein the computing system comprises a network of multiple interconnected computing devices.

12. The computer readable storage medium of claim 11, wherein at least one hardware component is a processor and the hardware operation is executing the software module.

13. The computer readable storage medium of claim 10, wherein the operations further comprise determining an idle power of the computing system by analyzing the repeated computing system power measurements and the events associated with the use of the hardware components during the times by the software module.

14. The computer readable storage medium of claim 10, further comprising determining another energy consumption associated with another software module using the hardware components during the times by analyzing the computing system power measurements and the events associated with the use of the hardware components during the times and by the software modules.

15. The computer readable storage medium of claim 10, wherein the operations further comprise using an application program interface (API) to obtain the events associated with the software module.

16. The computer readable storage medium of claim 10, wherein an event is a call to a driver associated with a hardware component.

17. The computer readable storage medium of claim 10, wherein the determining of the energy consumption associated with the software module further comprises using linear regression.

18. A computer readable storage medium storing computer executable instructions which when executed cause the computer to perform acts comprising:
- determining a power consumed by each of at least one of software module operating on a computing system based on at least one operation performed by at least one component of a plurality of hardware components of the computing system and an indication of a power consumed to perform a type of each of the at least one operation, the at least one operation being attributed to a corresponding software module; and
- wherein the at least one software module does not include code specifically intended to attribute the at least one operation to the software module for determining the power consumed by the software module, the acts further comprising:
- determining the indication of the power consumed by each of at least one type of operation performed by each of at least one component of the computing system by:
    - for a plurality of times, measuring a total power consumption of a plurality of hardware components of a computing system and determining one or more operations of the at least one types of operations performed by each of the plurality of hardware components during each of the plurality of times;
    - determining a power consumed by each of the plurality of hardware components to perform each of the at least one type of operations based on the total power consumed in the plurality of times and the one or more operations of the at least one type of operations performed during each of the plurality of times.

19. The computer readable medium of claim 18, wherein the at least one operation attributed to a corresponding software module is attributed to the corresponding software module based on an event log maintained by an operating system of the computing system.

* * * * *